(12) United States Patent
Kano et al.

(10) Patent No.: US 8,266,375 B2
(45) Date of Patent: *Sep. 11, 2012

(54) AUTOMATED ON-LINE CAPACITY EXPANSION METHOD FOR STORAGE DEVICE

(75) Inventors: Yoshiki Kano, Yokohama (JP); Manabu Kitamura, Yokohama (JP); Kouji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,097

(22) Filed: Sep. 12, 2011

(65) Prior Publication Data

US 2012/0005427 A1    Jan. 5, 2012

Related U.S. Application Data

(63) Continuation of application No. 12/876,325, filed on Sep. 7, 2010, now Pat. No. 8,028,127, which is a continuation of application No. 12/245,122, filed on Oct. 3, 2008, now Pat. No. 7,930,474, which is a continuation of application No. 10/991,421, filed on Nov. 19, 2004, now Pat. No. 7,447,832, which is a continuation of application No. 10/782,787, filed on Feb. 23, 2004, now Pat. No. 6,836,819, which is a continuation of application No. 09/931,253, filed on Aug. 17, 2001, now Pat. No. 6,725,328.

(30) Foreign Application Priority Data

Jul. 5, 2001    (JP) ................................ 2001-204305

(51) Int. Cl.
    *G06F 12/00*    (2006.01)

(52) U.S. Cl. ..................... 711/112; 711/4; 711/E12.019
(58) Field of Classification Search .................... None
    See application file for complete search history.

(56) References Cited

U.S. PATENT DOCUMENTS

| 5,129,088 A | 7/1992 | Auslander et al. |
| 5,193,184 A | 3/1993 | Belsan et al. |
| 5,394,532 A | 2/1995 | Belsan |

(Continued)

FOREIGN PATENT DOCUMENTS

EP    853281 A2    7/1998

(Continued)

OTHER PUBLICATIONS

U.S. Appl. No. 60/209,326, filed Jun. 2000, Reuter et al.

(Continued)

*Primary Examiner* — Kevin Verbrugge
(74) *Attorney, Agent, or Firm* — Mattingly & Malur, PC

(57) ABSTRACT

The storage system provides a logical volume and includes a plurality of disk devices and a controller, coupled to the plurality of disk devices, which manages a plurality of storage areas provided by the plurality of disk devices. The host includes an application which sends data to a logical volume and an operating system which manages a block position of the logical volume. If the operating system receives a request from the application to expand a first capacity of the logical volume, the operating system sends a write request to the logical volume. In response to the write request, the controller allocates at least one of the plurality of storage areas to the logical volume. The controller monitors a second capacity of storage areas allocated to the logical volume relative to a third capacity of the plurality of storage areas.

19 Claims, 14 Drawing Sheets

U.S. PATENT DOCUMENTS

| | | |
|---|---|---|
| 5,649,152 A | 7/1997 | Ohran et al. |
| 5,897,661 A | 4/1999 | Baranovsky et al. |
| 5,983,316 A | 11/1999 | Norwood |
| 6,058,489 A | 5/2000 | Schultz et al. |
| 6,148,414 A | 11/2000 | Brown et al. |
| 6,266,740 B1 | 7/2001 | Don et al. |
| 6,366,988 B1 | 4/2002 | Skiba et al. |
| 6,571,257 B1 | 5/2003 | Duggan et al. |
| 6,718,436 B2 | 4/2004 | Kim et al. |
| 6,728,831 B1 | 4/2004 | Bridge |
| 6,857,059 B2 | 2/2005 | Karpoff et al. |
| 2002/0026558 A1 | 2/2002 | Reuter et al. |
| 2002/0073297 A1 | 6/2002 | Mizuno et al. |
| 2002/0112113 A1 | 8/2002 | Karpoff et al. |
| 2003/0236945 A1 | 12/2003 | Nahum |
| 2005/0125593 A1 | 6/2005 | Karpoff et al. |

FOREIGN PATENT DOCUMENTS

| | | |
|---|---|---|
| GB | 2296798 A | 7/1996 |
| GB | 2297636 A | 8/1996 |
| JP | 3-024644 | 2/1991 |
| JP | 3-138737 | 6/1991 |
| JP | 8-063376 | 3/1996 |
| JP | 10-187505 | 7/1998 |
| JP | 2001-084112 | 3/2001 |

OTHER PUBLICATIONS

U.S. Appl. No. 60/261,140, filed Jan. 2001, Karpoff.
U.S. Appl. No. 60/209,109, filed Jun. 2000, Wrenn.
Japanese Patent Office Action dated Jan. 9, 2008, in corresponding JP Appln. No. 2001-204305, 3 pages including English translation.

FIG.2

| DISK ID (2100) | SEGMENT NUMBER (SN) (2200) | LBA (START) (2300) | SIZE (2400) | IN-USE (2500) |
|---|---|---|---|---|
| 0 | 0 | 0 | 1000 | 0 |
|   | 1 | 1000 | 1000 | 1 |
|   | 2 | 2000 | 1000 | 1 |
| 1 | 3 | 0 | 1000 | 1 |
|   | 4 | 1000 | 1000 | 1 |
| ... | ... | ... | ... | ... |

| LUN (3100) | SEGMENT NUMBER (SN) (3200) | LUN LBA (START) (3300) | LUN LBA (END) (3400) |
|---|---|---|---|
| 0 (3510) | 1 | 0 | 999 |
| (3520) | 2 | 1000 | 1999 |
| (3530) | 3 | 2000 | 2999 |
| 1 | 4 | 0 | 0 |
| 2 | 7 | 0 | 0 |
| ... | ... | ... | ... |

(3000, 3500)

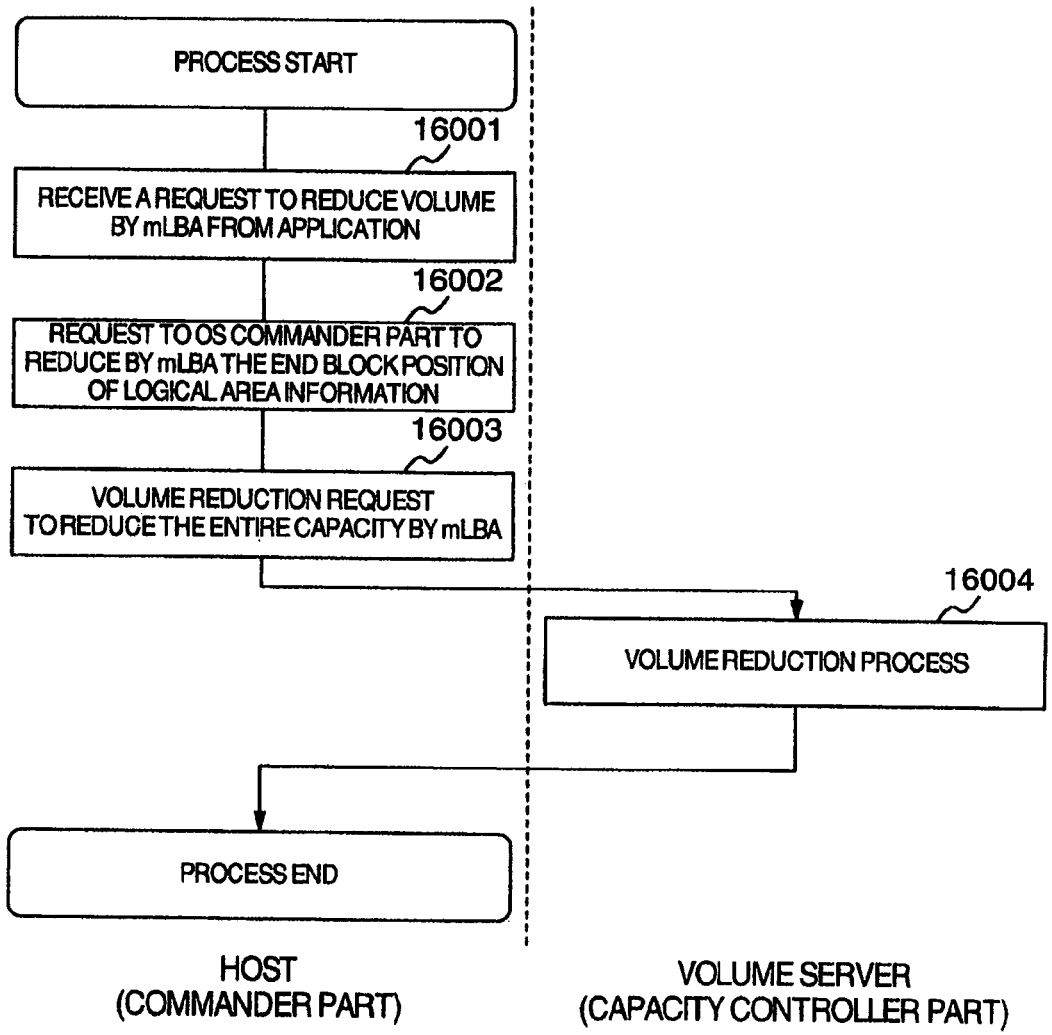
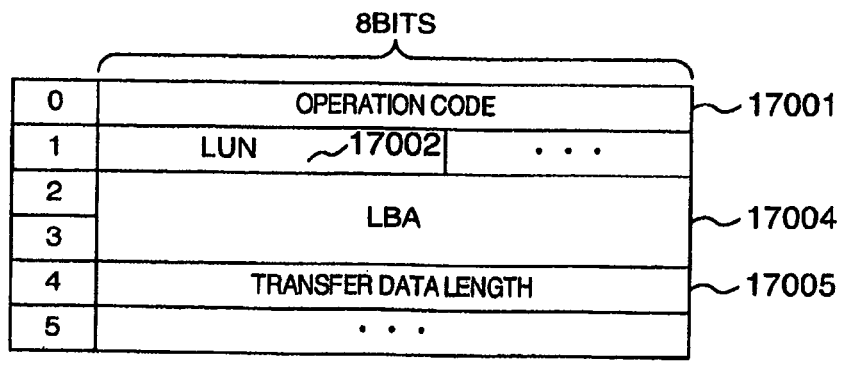

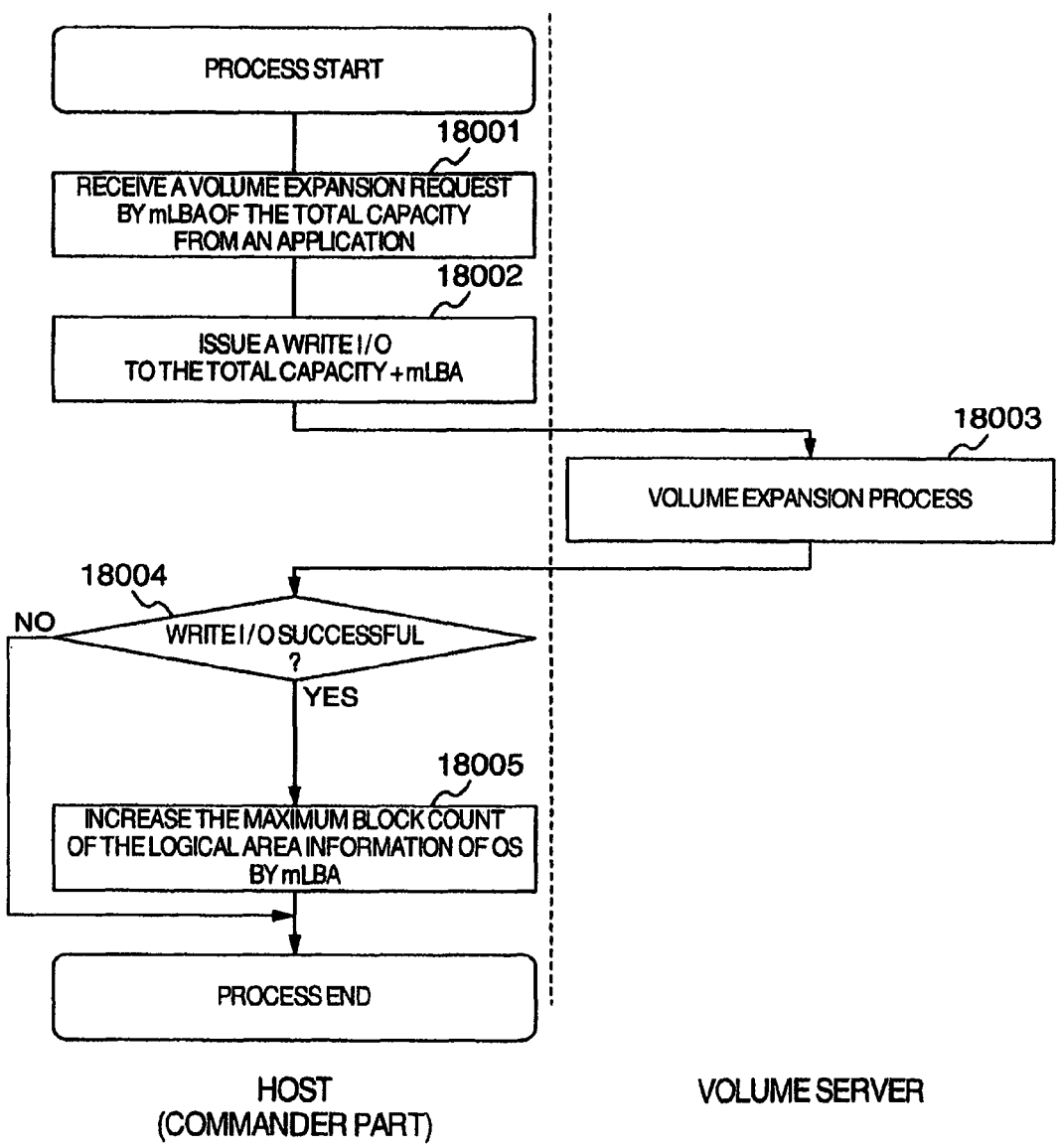

AUTOMATED ON-LINE CAPACITY EXPANSION METHOD FOR STORAGE DEVICE

CROSS-REFERENCES

This application is a continuation application of U.S. patent application Ser. No. 12/876,325, filed Sep. 7, 2010, now U.S. Pat. No. 8,028,127 which is a continuation application of U.S. patent application Ser. No. 12/245,122, filed Oct. 3, 2008 (now U.S. Pat. No. 7,930,474), which is a continuation of U.S. patent application Ser. No. 10/991,421, filed Nov. 19, 2004 (now U.S. Pat. No. 7,447,832), which is a continuation of U.S. patent application Ser. No. 10/782,787, filed Feb. 23, 2004 (now U.S. Pat. No. 6,836,819), which is a continuation of U.S. patent application Ser. No. 09/931,253, filed Aug. 17, 2001 (now U.S. Pat. No. 6,725,328), the entire contents of which are incorporated herein by reference.

This application claims priority to JP 2001-204305, filed Jul. 5, 2001.

BACKGROUND OF THE INVENTION

1. Field of the Invention

The present invention relates to a method for successive capacity expansion during on-line operation in a storage device system.

2. Description of the Related Art

Recently, storage domains of a plurality of host computers are often stored in a single storage device. This tendency is promoted by, for example, a disk array. The disk array provides redundancy of the storage domains by a plurality of magnetic disk devices in a system, thereby increasing reliability and providing a necessary storage domain as a logical volume to a plurality of hosts. One of the merits of using this disk array is capacity expansion of the logical volume.

For example, when a computer has used up a logical volume provided by a disk array, a free space in the disk array is cut out with an arbitrary length to be allocated as a logical volume, so that the computer can connect this logical volume to a logical volume in use, thereby expanding the storage domain. This function of volume expansion can also be performed during on-line and is called on-line volume expansion.

The on-line volume expansion enables to expand a range of the logical volume storage domain corresponding to data increasing as time passes, without stopping the application and accordingly, enables to expand the application operation time. Moreover, upon volume capacity transfer, there is no need of data transfer between volumes, which significantly reduces the storage management cost.

Conventionally, a logical volume user should report to a logical volume provider when expanding the on-line volume. In a small-size site such as within a single enterprise, there is no sudden data increase and it is not necessary to perform on-line volume expansion all the time. However, in a large-size site such as a data center where a plurality of enterprises utilize data, there is a possibility of a sudden data increase from computers of the plurality of enterprises and it is necessary to perform the on-line volume expansion at all time. Moreover, in order to enhance the utilization effect of a storage domain of a disk array or the like, it is necessary to provide a volume to a plurality of users in a single storage device without waste.

In order to effectively use a storage domain in a storage device, it is necessary to manage the storage area in unit of a logical volume of a small capacity and to expand the logical volume with the small-capacity logical volume when required. When using the on-line volume expansion in this condition, there is a case that a request for the on-line volume expansion is simultaneously caused by a plurality of users due to the data increasing as time passes and the logical volume provider may not be able to satisfy the requests. In the worst case, the on-line volume expansion cannot be performed and the computer operation is stopped.

A logical volume user make a request for an unlimited storage capacity without managing the storage domain. On the other hand, the logical volume provider should effectively manage the storage domain so as to provide a logical volume to the user as rapidly as possible without considering how the storage domain is used by the logical volume user.

SUMMARY OF THE INVENTION

It is therefore an object of the present invention to solve the requests of the storage resource user and provider by using a storage domain management apparatus capable of dynamically allocating a storage domain of an appropriate capacity from the storage domain collectively managed during a computer on-line operation, thereby expanding the logical volume.

A computer system according to the present invention includes at least one host computer, at least one disk device, and a volume providing device which are connected to one another. The volume providing device managing a plurality of disk devices provides a logical volume corresponding to each of the host computers from the plurality of disk devices. The host computer sends an I/O request to a logical volume, and a volume providing part interprets a logical block address where the I/O request is read and written. When the logical volume has no storage domain of the logical block address accessed by the I/O request, the volume providing device allocates a storage domain from a free magnetic disk device, thereby dynamically expanding the logical volume storage domain. Moreover, the logical volume is reduced by an arbitrary amount indicated by an application.

BRIEF DESCRIPTION OF THE DRAWINGS

FIG. 2 shows a segment management table 2000;

FIG. 3 shows a physical and logical management table 3000;

FIG. 16 shows an operation flow of a logical volume storage capacity expansion between a commander part 1132 in the host 1100 and the capacity controller part 1232 in the volume server 1200;

FIG. 17 shows a physical format of an I/O command; and

FIG. 18 shows an operation flow of a logical volume storage capacity expansion between the commander part 1132 in the host 1100 and the capacity controller part 1232 in the volume server 1200.

DESCRIPTION OF THE EMBODIMENTS

Description will now be directed to embodiments of the present invention with reference to the attached drawings.

(1) First Embodiment

Figure 1:
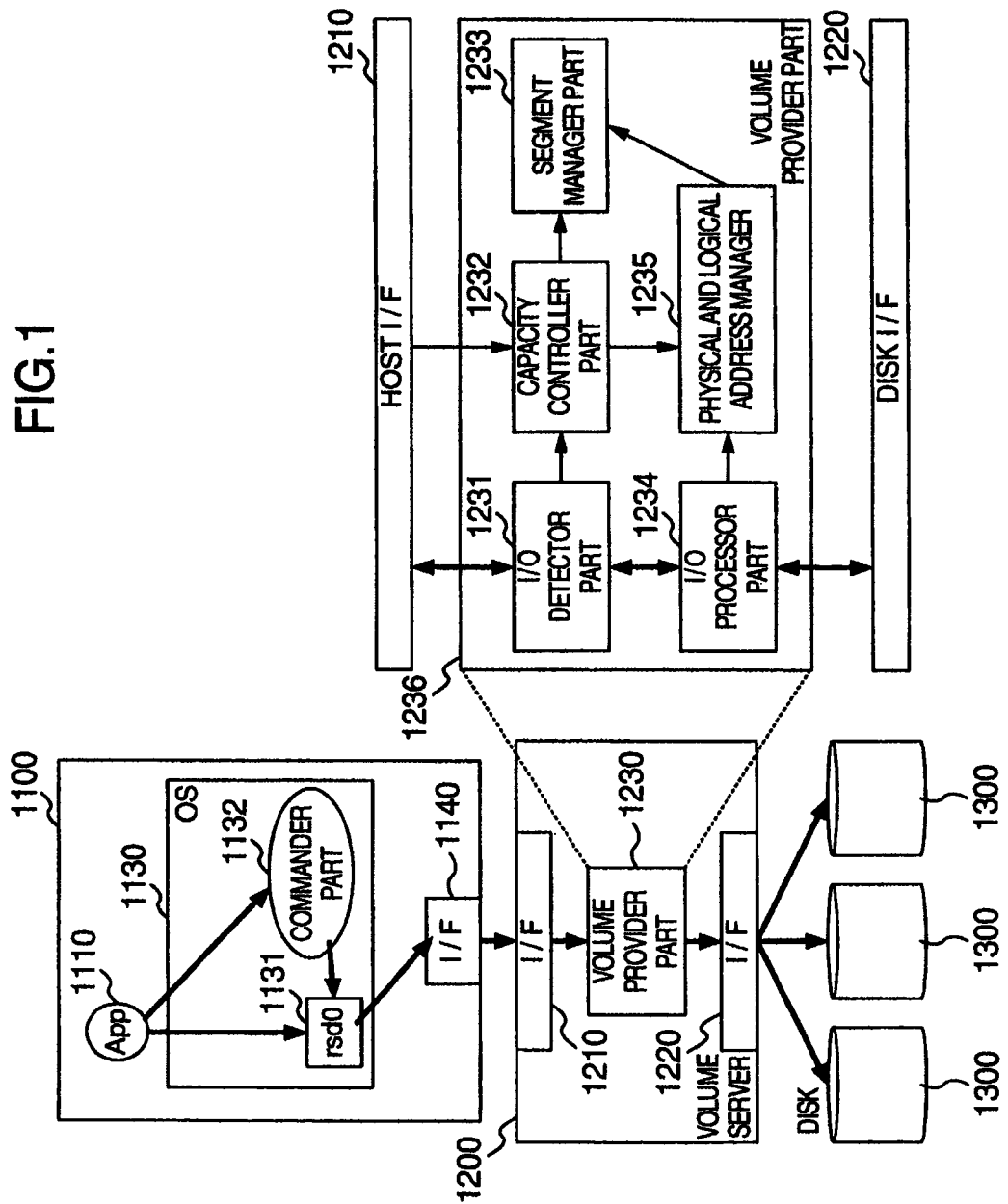
FIG. 1 shows configuration of a storage device system.

FIG. 1 shows a configuration m system includes a plurality of hosts 1100, a volume server 1200, and a plurality of magnetic disk device 1300. In this embodiment a single host 1100 and three magnetic disk devices are used, but only one magnetic disc device or any numbers of devices 1300 may be used instead. Moreover, the host 1100, the volume server 1200, and the magnetic disk devices 1300 have CPU, memory, and the like but they are not direction relationship with explanation of the embodiment of the present invention and their explanations are omitted.

The host 1100 has an application program (App) 1110, an operating system (hereinafter, referred to as OS) 1130, and a channel interface 1140. The application 1110 is application software such as a DB and a file system for reading and writing from/to a volume provided from the volume server 1200 as the volume providing device. The operating system 1130 includes a volume device part (rsd0) 1131 for receiving an I/O request from the application 1110 and transferring the I/O request to the channel interface (I/F) 1140, and a commander part 1132. The commander part 1132 is software performing management of logical area information including a start block position and an end block position of the storage device used by the OS 1130 and operation control of the volume server 1200.

Figure 4:
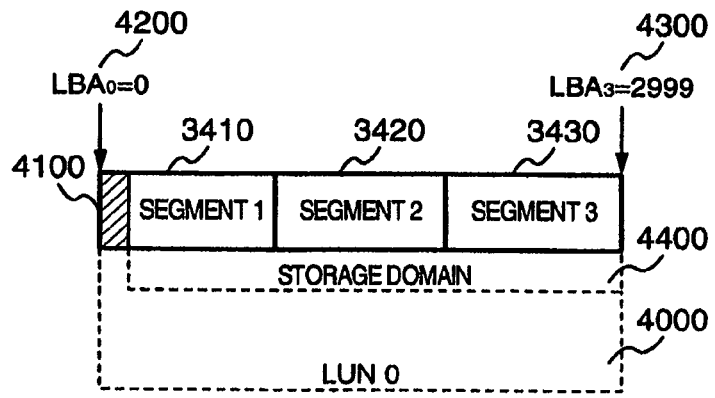
FIG. 4 shows a physical relationship between LUNO (4000), segment 1 (3410), segment 2 (3420), and segment 3 (3430)

By referring to FIG. 4 showing a logical volume as a storage domain provided by the volume server 1200, explanation will be given on the logical area information 4100. Since in this embodiment a volume is dynamically expanded, the start block position of the logical area information handled by the OS 1130 is indicated by OLBA (4200) and the end block position indicates a capacity of the maximum storage device supported by the OS of the storage device or a storage capacity used by a user. When the maximum capacity is limited by a storage capacity used by the user, the storage domain of the logical volume provided by the volume server 1200 is also limited by this end block position. Moreover, the logical area information is stored in the storage device managed by the OS 1130 in a necessary area between the start block position OLBA (4200) and LBA to define the necessary area (4100). Normal data to be stored is stored in a storage domain (4400) other than the logical area information.

The I/F 1140 shown in FIG. 1 is a block device I/F having a function to transfer an I/O from the OS 1130 to an external device such as a fibre channel I/F and an SCSI I/F.

A command controlling between the host 1100 and the volume server 1200 and between the volume server 1200 and the magnetic disk device 1300 is called an I/O request. The I/O request is a command of a block device protocol such as the SCSI protocol. FIG. 17 shows a command format of the I/O request. The I/O request has an operation code 17001, a LUN (logical unit number) 17002, an LBA (logical block address) 17003, and a transfer data length 17004. The operation code 17001 is a number indicating a read process, write process, and the like. The LUN 17002 is a unique number of a logical volume to be processed by the command. The LBA 17003 is a position for processing a logical volume provided by the volume server. The transfer data length 17004 shows an amount to be processed all-at-once by the I/O request.

The volume server 1200 includes: a channel I/F 1210 at the host side; a volume provider part 1230 performing processing of an I/O request requested from the host 1100 and management of the magnetic disk device 1300; and a channel I/F 1220 for transferring the I/O request requested by the volume provider part 1230 to the magnetic disk device 1300. The channel I/F 1200 at the host side is a block device I/F such as a fibre channel I/F and the SCSI which can be connected to the host 1100. In this embodiment, the channel of the host 1100 side is separated from the channel of the magnetic disk device 1300 side but the channel I/F 1210 of the host 1100 side and the channel I/F 1220 of the magnetic disk device 1300 may be shared by each other.

Moreover, this volume server 1200 provides a logical volume having a limitless capacity to the host 1100. That is, when the volume server 1200 is viewed from the host 1100, the start value of the logical block number (LBA) defining a volume range is always 0 but the LBA of the range end may not be determined. Moreover, when the LBA of the range end is defined, the value indicates the volume maximum capacity provided by the volume server 1200.

The volume provider part 1230 in the volume server 1200 includes an I/O detector part 1231, a capacity controller part 1232, a segment manager part 1233, and I/O processor part 1234, and a physical and logical address manager 1235. The segment manger part 1233 has a segment management table 2000 inside, and this segment management table 2000 is used to perform management of the storage domain of the volume provided by the volume server 1200.

The segment management table 2000 shown in FIG. 2 includes a disk number (disk ID) 2100, a segment number (Segment Number) 2200, a starting LBA (LBA (START)) 2300, a segment size (Size) 2400, and a value of segment state (In-Use) 2500. The disk ID 2100 is a unique identification number of a disk determined by a block level protocol such as the SCSI when the magnetic disk device 1300 is connected to the volume server 1200. The segment is a minimum unit of a storage domain in each of the magnetic disk device 1300 to be managed by the volume server 1200, and the segment number 2200 is a unique identification number for management of the segment by the volume server 1200. The LBA (START) 2300 defines a physical position where the storage domain of the segment starts in the magnetic disk device 1300 of the disk ID 2100. The segment size indicates the storage domain starting at the LBA (START) 2300 in the disk. The segment state indicates whether the segment storage domain is used or not used by the volume server 1200, using two values: value 1 indicates the in-use state and value 0 indicates the not-in-use state.

Next, the physical and logical address manager 1235 performs physical and logical management between a logical volume provided by the volume server 1200 and the magnetic disk device 1300 storing data. As means for managing the logical volume and the magnetic disk device 1300 containing real data, the physical and logical address manager 1235 has a physical and logical management table 3000 of FIG. 3. This physical and logical management table 3000 is used for management of a logical unit number (LUN) 3100, a segment number (Segment Number) 3200, a LUN LBA (START) 3330, and a LUN LBA (END) 3400. The LUN 3100 is called a logical unit number indicating a unique number of a logical volume provided from the volume server 1200 to the host 1100. The segment number 3200 is a unique number of a storage domain managed by the segment manager part 1233. A logical volume provided by the LUN 3100 consists of a plurality of segments and the logical block numbers (LBA) of the logical volume are successively connected in an ascending order (from younger to older) in each LUN 3100 of the physical and logical management table 3000.

For example, in FIG. 3, when LUN0 (3500), the segment number 1 (3510), the segment number 2 (3520), and the segment number 3 (3530) are connected in this order and are provided, as shown in FIG. 4, as a single logical volume of the LUN0 (4000) to the host 1100. The LUN LBA (START) 3300 indicates a start position of the LBA used by the segment in the LUN. The LUN LBA (END) 3400 indicates an end position of the LBA used by the segment in the LUN. The I/O detector part 1231 detects LBA in each I/O request accessed from the host 1100 to the magnetic disk device 1300. The I/O processor part 1234 performs I/O processing of actual read/write. The capacity controller part 1232 increases/decreases a capacity requested from the I/O detector part 1231 or the commander part 1132 of the host 1100.

In this embodiment, the volume server 1200 is arranged as an independent unit but it is also possible that the magnetic disk device 1300 has the function of the volume server 1200.

Moreover, in this embodiment the volume expansion is performed in segment basis but the volume expansion can also be performed in block basis as follows. When the segment manager part 1233 and the physical and logical address manager 1235 are considered to be, for example, a capacity-expandable file system such as a Log Structured file system, the segment as the minimum unit of the storage domain in the segment management table 2000 and in the physical and logical management table 3000 can be replaced by a block which is the minimum unit of the file system storage domain and the file of the file system can be considered to be a logical volume having the LUN 3100 provided from the volume server 1200. That is, even when the segment manager part 1233 and the physical and logical address manager 1235 are replaced by a file system, it is possible to provide a logical volume which can be dynamically expanded in block basis.

Figure 5:
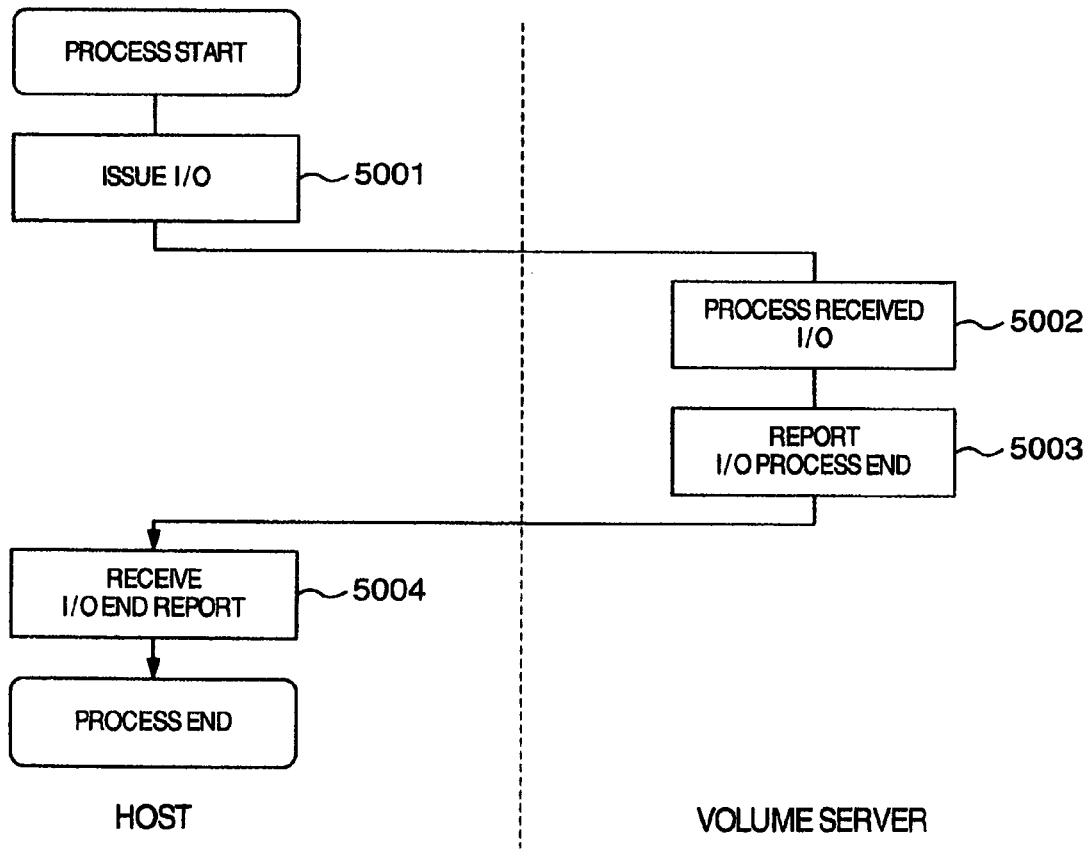
FIG. 5 shows a flow of an I/O operation performed between a host 1100 and a volume server 1200.

Next, explanation will be given on the operation of the volume server 1200, referring to FIG. 5. After an I/O request is issued from the host 1100 to the volume server 1200 (step 5001), the volume server 1200 performs processing of the received I/O request in the volume provider part 1230 (step 5002). Upon completion of the I/O request processing, an I/O request processing completion report is issued to the host 1100 (step 5003). The host received the I/O completion report (step 5004) and the process is terminated. The volume provider part 1230 of the volume server 1200 seems to operate in the same way as a controller of a conventional magnetic disk device 1300 but it is configured to be able to expand a volume without limit. Hereinafter, explanation will be given on the internal operation of the volume provider part 1230 having this configuration.

The volume provider part 1230 is operated by combination of the I/O detector part 1231, the I/O processor part 1234, the physical and logical address manager 1235, the capacity controller part 1232, and the segment manger part 1233. In an enlarged view 1236 of the volume provider part 1230 of FIG. 1, thick lines indicate an I/O request flow and thin lines indicate a control flow. Firstly, an I/O request flowing from the host side I/F 1210 is processed by the I/O detector part 1231 and then LBA of each I/O request is physically-logically converted in the I/O processor part 1234, after which read or write is performed from or to the respective magnetic disk devices 1300. This processing flow will be detailed below.

Figure 6:
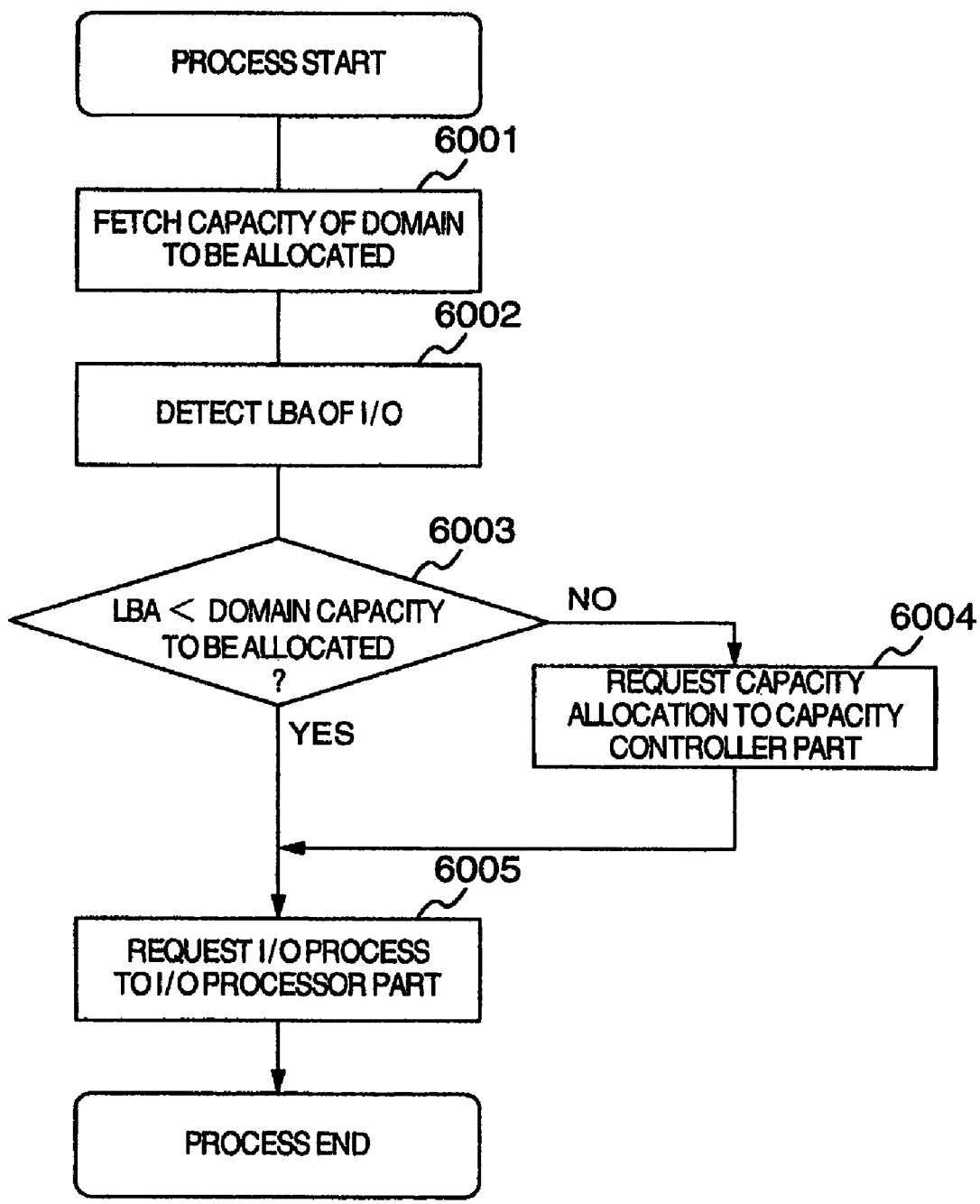
FIG. 6 shows an operation flow of an I/O detector part 1231.

Firstly, explanation will be given on the operation of the I/O detector part 1231, referring to FIG. 6. A currently allocated domain capacity of a logical volume in each LUN is calculated by adding the respective segment size 2400 in the LUN using the segment number of the physical and logical management table 3000 of FIG. 3 and the segment management table 2000 of FIG. 2 describing the size 2400 of each segment (step 6001). When an I/O request is sent from the host 1100, an LBA to be accessed in the logical volume by the I/O request is detected (step 6002). When the currently allocated area is determined to be larger than the LBA accessed (step 6003), the I/O processing is requested to the physical and logical address manager 1235 (step 6005). When the currently allocated area is determined to be smaller than the LBA accessed (step 6003), then a capacity allocation is requested to the capacity controller part 1232 (step 6004) and the I/O processing is requested to the I/O processor part 1234 (step 6005).

Figure 7:
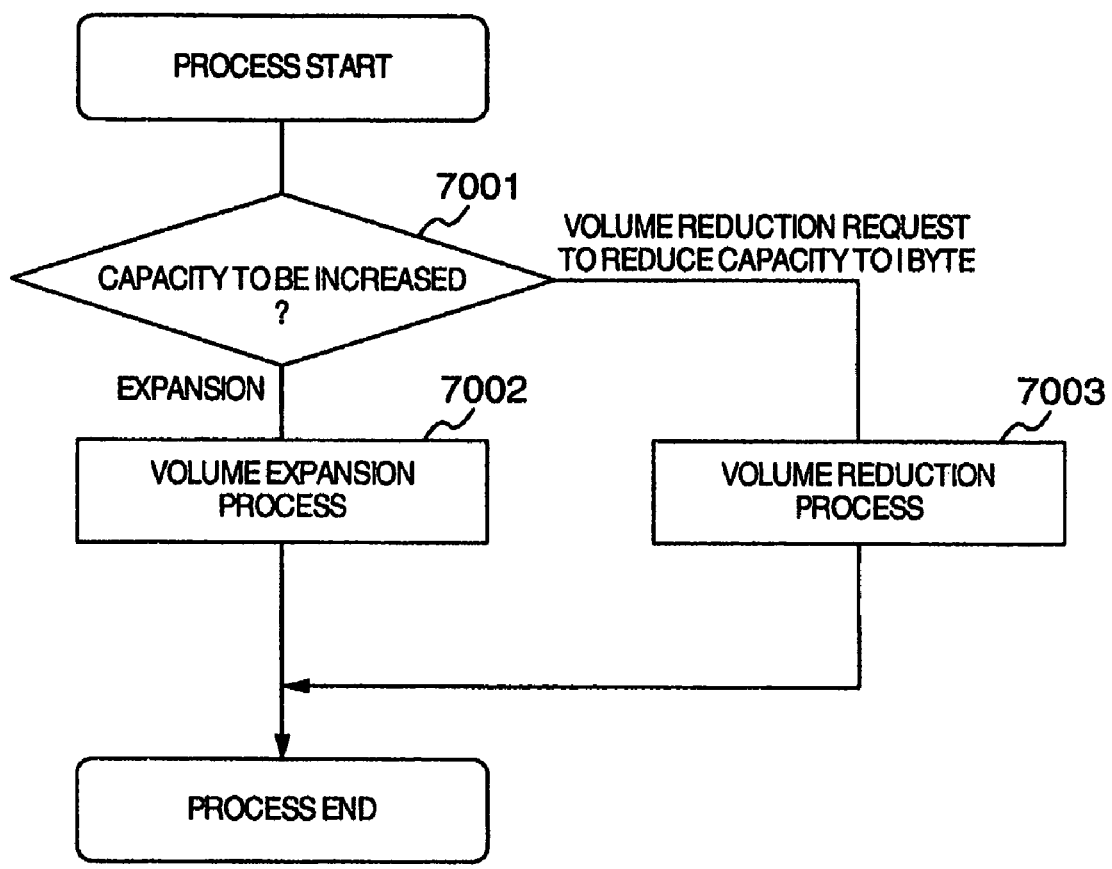
FIG. 7 shows an operation flow of a capacity controller part 1232.

Next, referring to FIG. 7, explanation will be given on the operation of the capacity controller part 1232. The operation is different for a request from the I/O detector part 1231 and for a request from the commander part 1132 of the host 1100. Firstly, explanation will be given on the operation for the I/O detector part 1231. When the I/O detector part 1231 issues a capacity increase command (step 7001), a volume increase processing is performed (step 7002) and the processing is terminated. On the other hand, when the commander part 1132 of the host 1100 issues a command to reduce the entire capacity by mLBA (step 7001), the volume reduction by mLBA is performed (step 7003).

Figure 8:
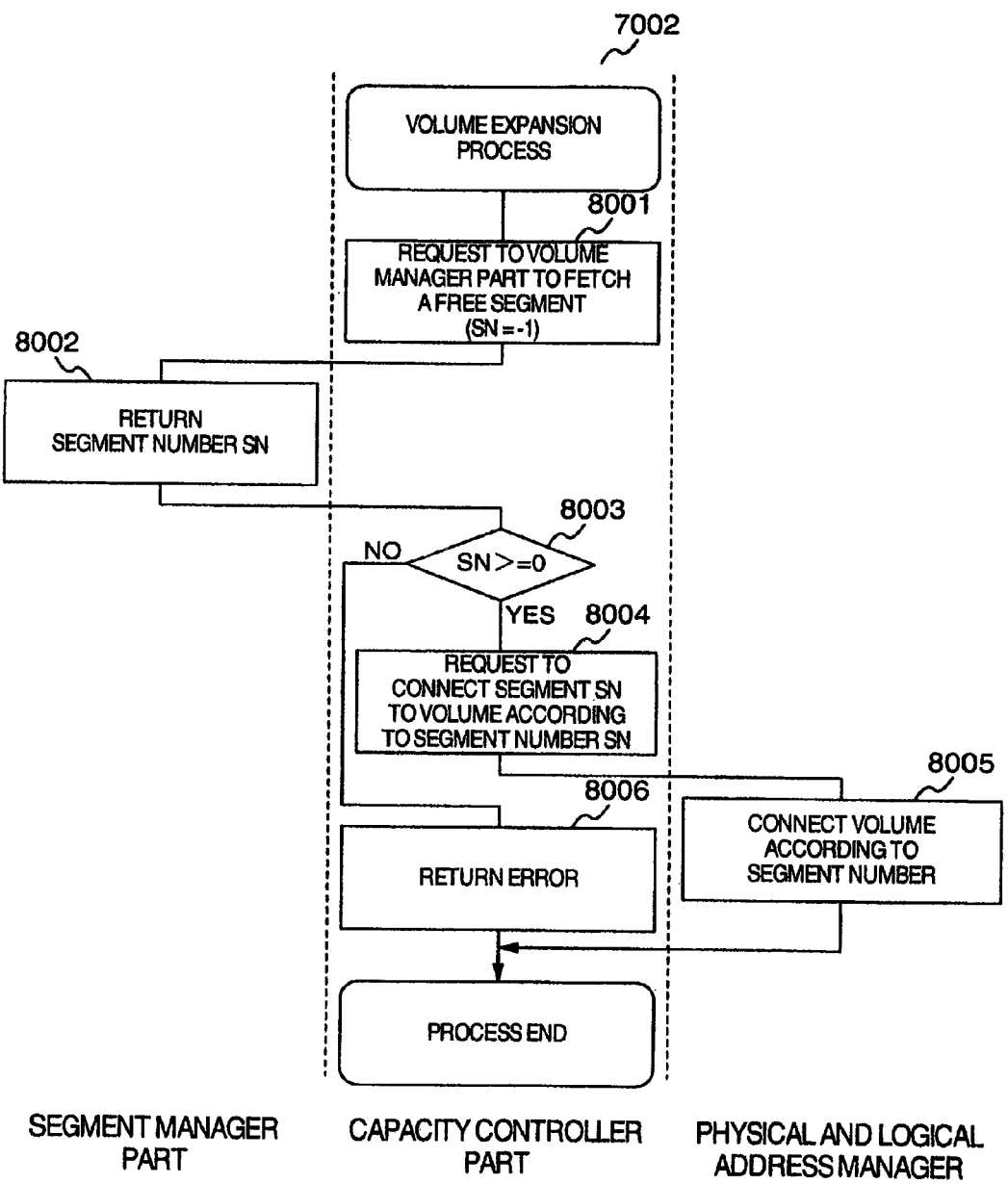
FIG. 8 shows an operation flow of a volume expansion process between a segment manager part 1233, the capacity controller part 1232, and physical and logical address manager 1235.

In a volume increase processing (step 7002), the segment manager part 1233 operates in combination with the physical and logical address manager 1235 as follows (FIG. 8). Firstly, a free segment fetch request is sent to the segment manager part 1233 with a segment number parameter SN=−1 (step 8001). When the segment requested is present, the segment manager part 1233 puts a segment number (SN>=0) in the segment number parameter SN and returns it. When the segment requested is not found, SN=−1 is returned (step 8002). Upon reception of the segment number, the capacity controller part 1232 determines whether the segment number parameter SN is a positive number (step 8003). If SN>=0, the process is continued and if SN<0, an error is returned (step 8006), thus terminating the process. The capacity controller part 1232 makes a volume connection request to the physical and logical address manager 1235 according to the segment number SN fetched from the segment manager part 1233 (step 8004). The physical and logical address manager 1235, according to the segment number, connects a segment to the end segment of a logical volume as a target LUN in the physical and logical management table 3000 (step 8005), thus terminating the process. The operation of this physical and logical address manager 1235 will be detailed later.

Figure 9:
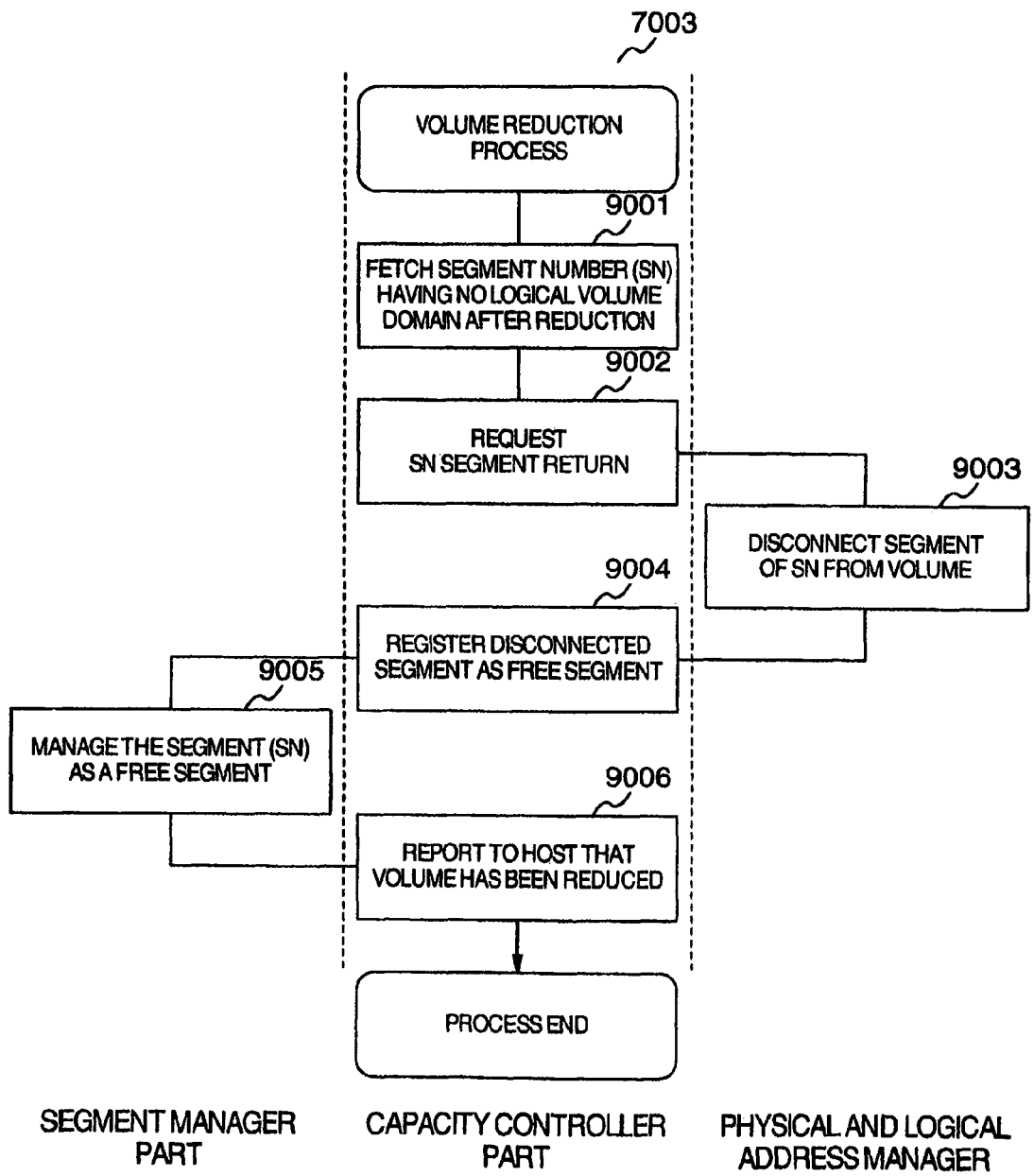
FIG. 9 shows an operation of a volume reduction process between the segment manager part 1233, the capacity controller part 1232, and the physical and logical address manager 1235.

On the other hand, a volume reduction process (step 7003) is performed as follows (FIG. 9). When the reduction capacity is mLBA, at least one segment number having no logical volume domain after the reduction is fetched from the physical and logical management table 3000 (step 9001). The segment fetch is performed as follows. Firstly, from the physical and logical management table 3000, the LBA after the reduction is calculated from the end LBA (3400) as LBA (END) −m. According to this LBA after the reduction, one or a plurality of segment numbers (SN) not overlapping with the LBA after the reduction in the target LUN are fetched.

Next, for these segments, a segment return request is made to the physical and logical address manager 1235 (step 9002). The physical and logical address manager 1235 disconnects a record matched with the segment number (SN 3200, LBA (START) 3300, LBA (END) 3400) from the list of the logical volume specified by the LUN in the physical and logical management table 3000 (step 9003). The capacity controller part 1232 issues a command to manage the disconnected segment number SN as a free segment to the segment manager part 1233 (step 9004). The segment manager part 1233 manages the disconnected segment as a free segment (step 9005). The disconnection of the logical volume is reported to the host 1100 (step 9006). Thus, the volume reduction process is completed.

The segment manager part 1233, upon reception of an instruction from the capacity controller part 1232, performs a segment state management of the segments described in the segment management table 2000 and management of segment addition/deletion. The segment state management is performed according to the aforementioned management procedure of the segment management table 2000.

Figure 10:
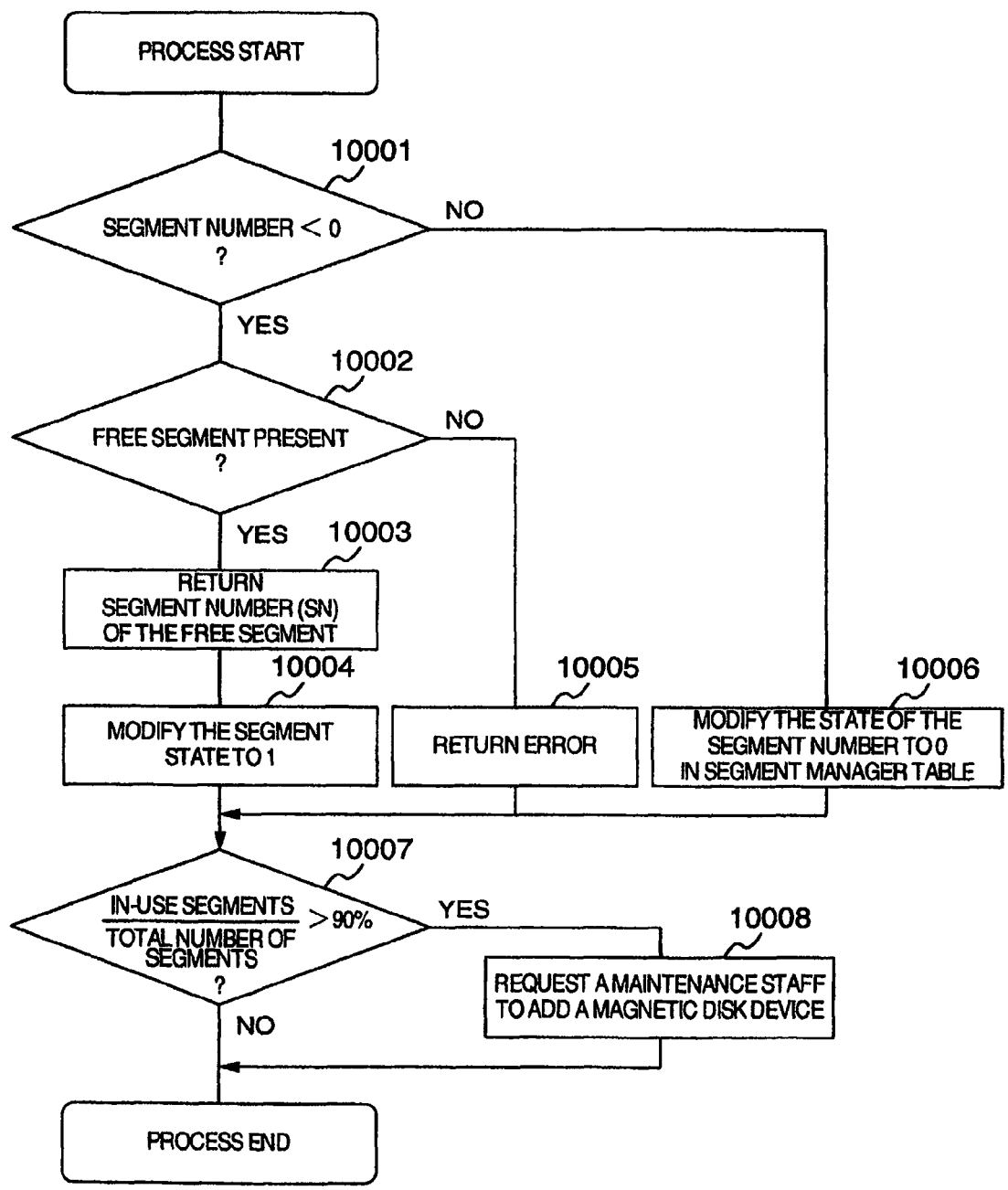
FIG. 10 shows an operation flow of segment state management by the segment manager part 1233.

Referring to FIG. 10, explanation will be given on the operation of the segment state management. Firstly, a volume control request is passed from the capacity controller part 1232 together with a segment number of an argument. If the segment number<0, it is determined that the request is made for fetching a free segment (step 10001) and the process proceeds to step 10002. When the free segment fetch request is made, it is checked whether a free volume exists by using the segment management table (step 10002). If no volume is free (step 10002), an error is reported to the capacity controller part 1232 (step 10005). If a free segment exists (step 10002), the segment number of the free segment is returned to the capacity controller part 1232 (step 10003). The state for the segment in the segment management table is modified to 1 indicating the in-use state (step 10004) and the process proceeds to step 10007.

On the other hand, if the segment number>=0 (step 10001), the request is determined to be an operation for transferring the segment not-in-use state, and the process is continued in step 10006. In step 10006, the state of the segment number is set to 0 indicating the not-in-use state in the segment management table 2000 and the process proceeds to step 10007. In step 10007, by using items of the state 2400 in the segment management table 2000, a segment use ratio (the number of segments in use against the total number of segments) is calculated from the number of segments in use and the total number of segments and it is determined whether the use ratio is equal to or more than 90%. If the use ratio is 90% or above, a request is made to a maintenance staff to add a magnetic disk device 1300 (step 10008), thus terminating the process. If the use ratio is below 90%, then the process is terminated as it is. The threshold value of the use ratio may also be set to other than 90% according to the system reliability by the maintenance staff. This completes the explanation on the operation of the volume use state management by the segment manager part 1233.

Figure 11:
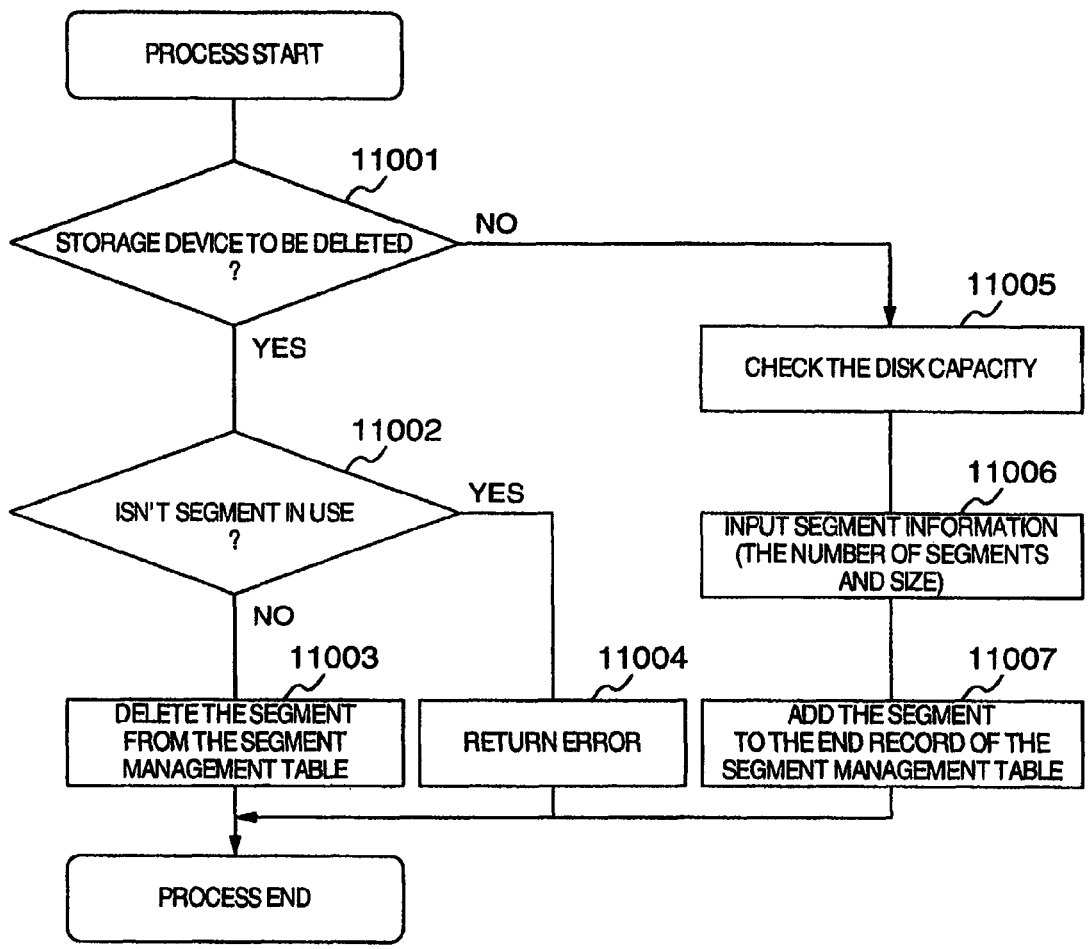
FIG. 11 shows an operation flow of disk addition or deletion by the segment manager part 1233.

Next, referring to FIG. 11, explanation will be given on the addition/deletion operation of the magnetic disk device 1300. Step 11001 determines whether a volume addition or deletion is to be performed. If addition, then the process proceeds to step 11005; and if deletion, the process proceeds to step 11002. In case of addition of the magnetic disk drive 1300, step 11005 checks the capacity of the magnetic disc device 1300 (step 11005). According to the capacity checked, the number of segments and the size are determined (step 11006). The number of segments and the size may be values specified by a maintenance staff or fixed values According to the values, upon each addition of a magnetic disc drive 1300 to the end of the segment management table 2000, the disk ID 2100, the segment number 2200, the start position 2300, the segment size 2400, and 0 (not-in-use) as the use state 2500 are inserted (step 11007), thus completing the process.

On the other hand, in case of a volume deletion, it is determined that the segment of the segment number is a free segment or not (step 11002). If the segment is free, a record of that segment number is deleted from the segment management table 2000 (step 11003). If the segment is not a free segment (step 11002), an error is returned and the process is terminated (step 11004).

This completes the explanation on the segment addition/deletion operation of the segment manager part 1233. The segment manager part 1233 performs management of the segment use state and the addition/deletion operation according to the aforementioned procedure.

Figure 12:
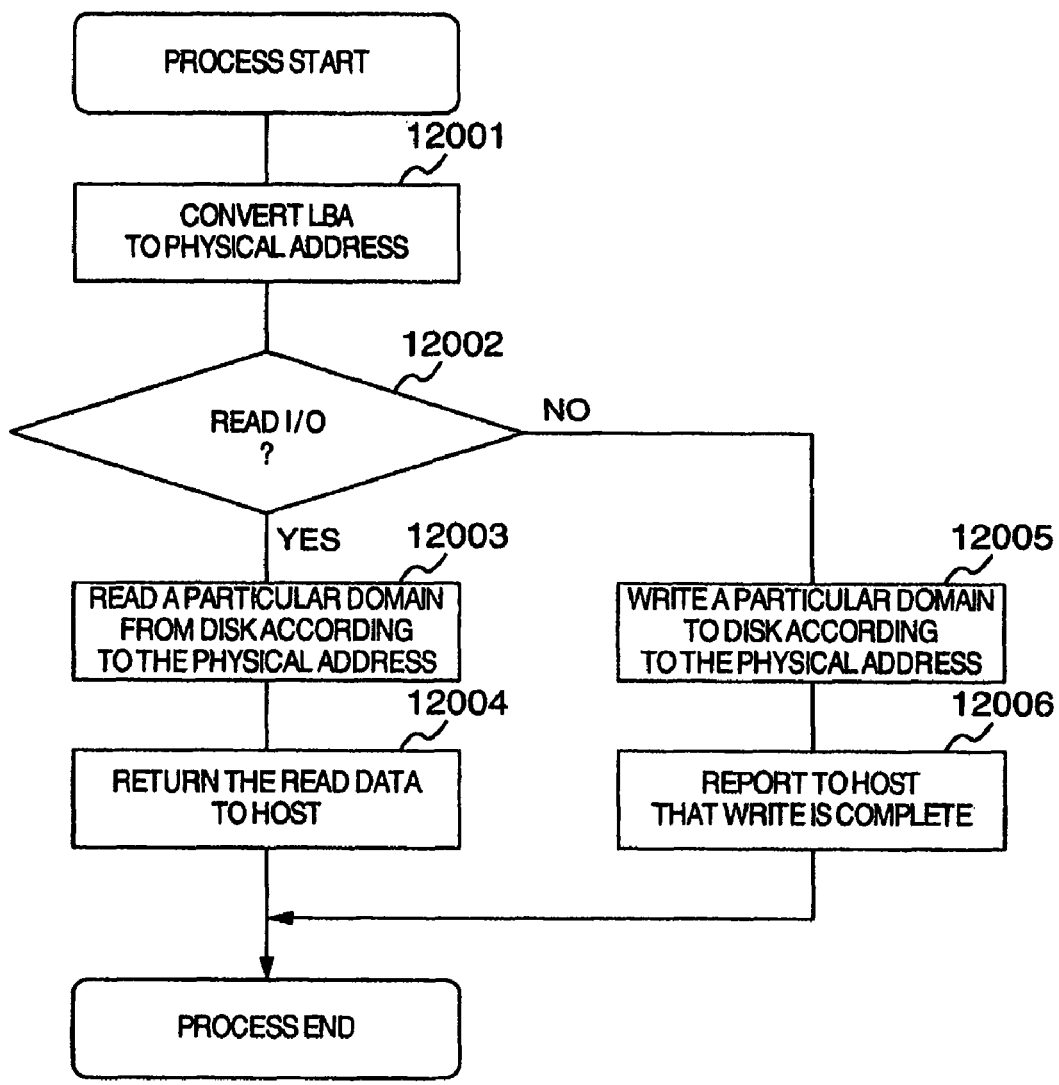
FIG. 12 shows an operation flow of an I/O processor part 1234.

Referring to FIG. 12, explanation will be given on the operation of the I/O processor part 1234. Firstly, an I/O request sent from the I/O detector part 1231 to the I/O processor part 1234 requests the physical and logical address manager 1235 to convert the LBA of the I/O request into a physical address (step 12001). Next, a type of the I/O request is determined (step 12002). If the I/O request is a read I/O, using the physical address, data is read out from the magnetic disk device 1300 (step 12003) and the read out data is returned to the host 1100 (step 12004). If the I/O request is a write I/O, using the physical address, data is written to the magnetic disk device 1300 (step 12005) and the write completion is reported to the host 1100 (step 12006). This completes the explanation on the operation procedure of the I/O processor part 1234.

Figure 13:
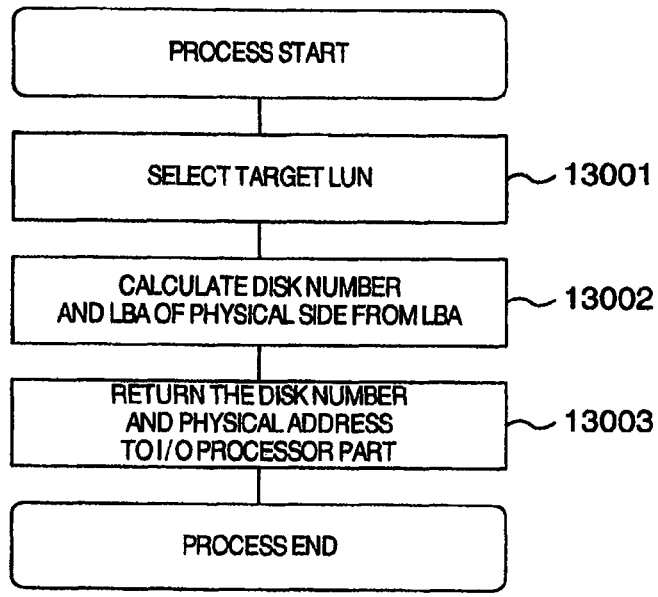
FIG. 13 shows an operation from of a physical and logical address conversion by the physical and logical address manager 1235.
Figure 14:
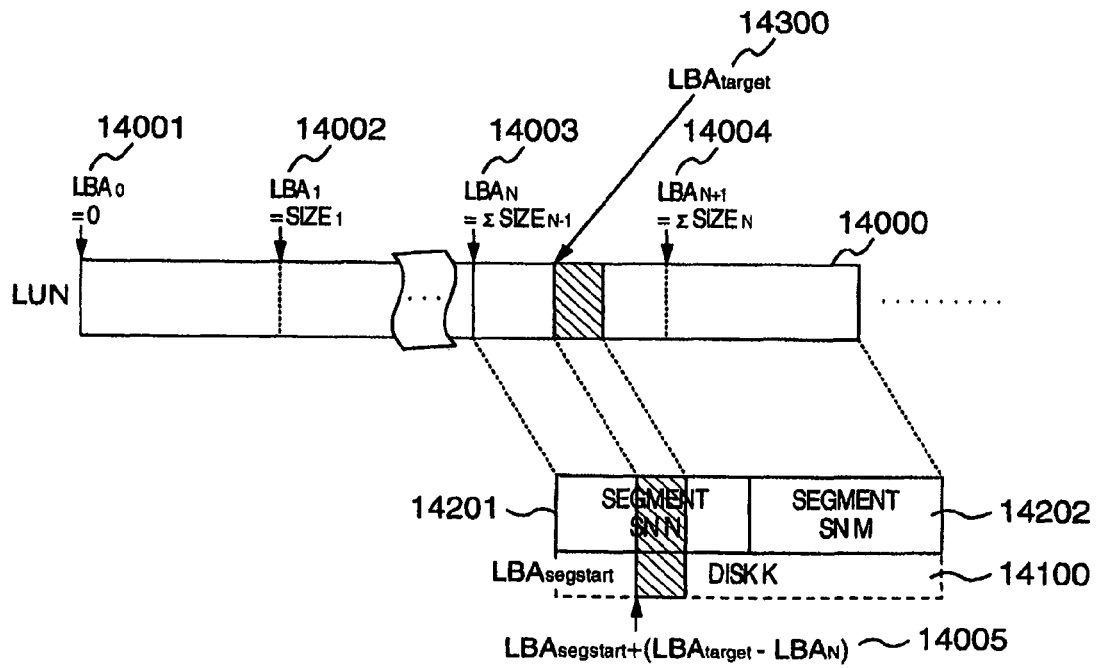
FIG. 14 shows a logical relationship between the LUN 14000, segment 14201, the segment 14202, and a magnetic disk device 14100.

The operation of the physical and logical address manager 1235 can be separated in two processes. One of them is a physical and logical address conversion procedure requested by the I/O processor part 1234. This conversion procedure will be explained with reference to FIG. 13 and then a physical-logical structure between an actual physical address and a logical address will be explained with reference to FIG. 14. For the conversion, a rule as follows is used. Firstly, a segment group corresponding to the LUN as an I/O request target is selected (step 13001). A disk number and an LBA of the physical side are calculated from the LBA (step 13002).

The calculation is performed as follows. Firstly, according to an LBA target described in the I/O request, by referencing each segment start LBA from the physical and logical management table 3000, segment number (SN) to be accessed by the LBA target (143000 in FIG. 14) is selected from a plurality of segments to which the target LUN belongs. According to the selected segment number SN, using the segment management table 2000, a disk ID to be accessed by the LBA target (14300), and a physical address of the segment from the head of the magnetic disk device are specified. When viewed from the N-th segment head physical address LBAN (14003), the address on the segment where data is operated is LBA target–LBAN. Accordingly, the physical address of the segment from the head of the magnetic disk device 1300 is: (segment head LBA LBA segstart)+(LBA target–LBAN) (14005). The disk ID 2100 and the value of (segment head LBA LBA segstart)+(LBA target–LBAN) (14005) as the LBA of the magnetic disk device 1300 of the disk ID 2100 are returned to the I/O processor part 1234 (step 13003).

Figure 15:
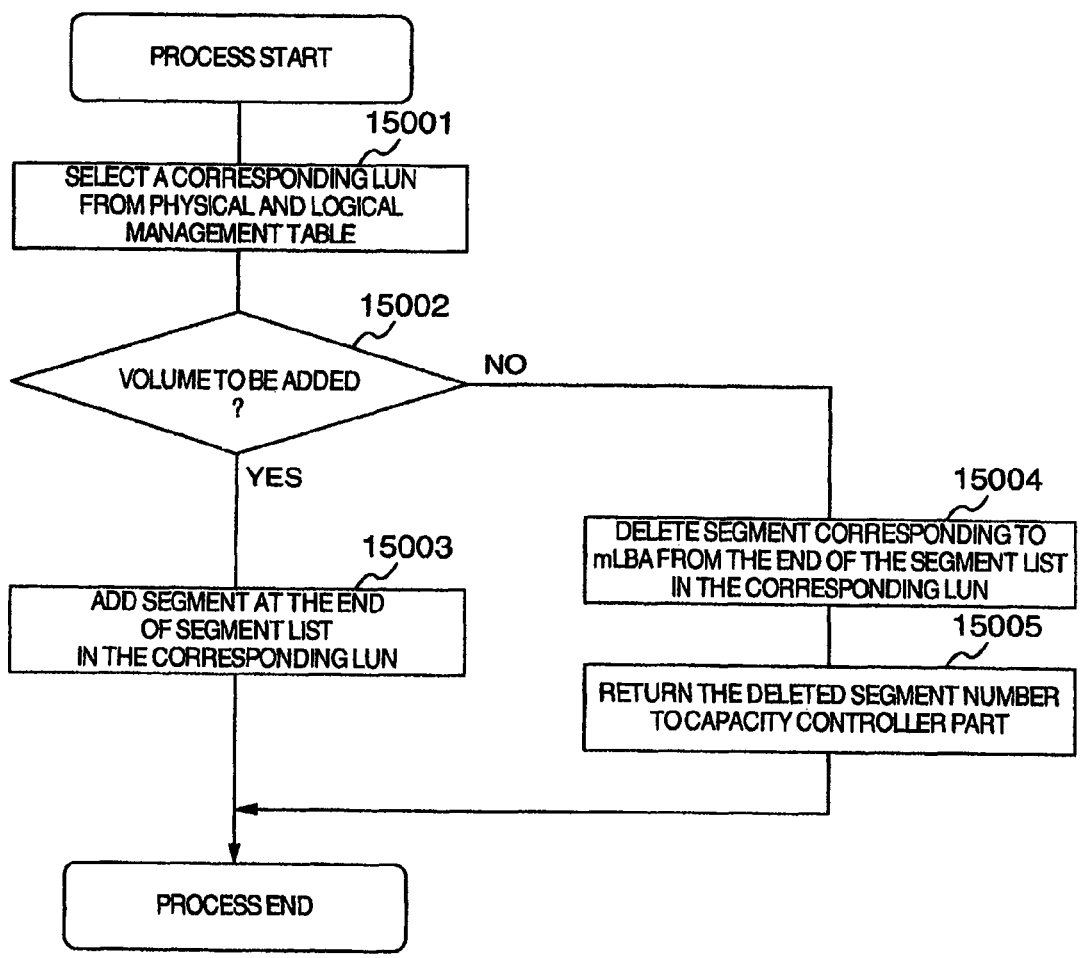
FIG. 15 shows an operation flow of addition/deletion of a segment to/from the physical and logical management table by the physical and logical address manager 1235.

The other operation process of the physical and logical address manager. 1235 is volume addition/deletion to/from the physical and logical management table 3000. This operation will be explained with reference to FIG. 15. A LUN in the physical and logical management table is selected (step 15001). For a volume addition (step 15002), a segment number to be added is given from the capacity controller part 1232 and in the LUN volume to be added, the segment is added to the end of the segment record (step 15003). Here, when the added segment is viewed from the host 1100, an added volume exists between the addresses from LBAN (14003) to LBAN+SIZEN (14004). When deleting a volume (step 15002), after receiving an instruction of deleting mLBA from the capacity controller part 1232, the capacity of mLBA is deleted in segment basis from the end of the segment record in the LUN volume to be deleted (step 15004). The segment deleted returns its segment number to the capacity controller part 1232 (step 15005). This completes the explanation of the operation of the physical and logical address manager 1235.

The commander part 1132 of the host 1100 is a program which, after reducing the data capacity in the volume used by the application 1110, upon reception of an instruction from the application or the user, sends an instruction to the volume server 1200 via the I/F 1140 so as to reduce in segment basis the storage domain of the logical volume provided by the volume server 1200. This operation will be detailed below by referring to FIG. 16.

Firstly, a request to reduce the volume by mLBA is received from the application 1110 (step 16001). The commander part 1132 reduces by mLBA the end block position of the logical area information of the logical volume under control of OS 1130 (step 16002). The volume of mLBA capacity is issued from the commander part 1132 to the capacity controller part 1232 of the volume server (step 16003). The capacity controller part 1232 performs a volume reduction processing (step 16004) and returns the result to the host 1100. This completes the explanation of the operation of the commander part 1132.

Next, explanation will be given on the interlocked operation with the application 1110. As has been described above, the host 1100 can handle a logical volume provided from the volume server 1200 as an existing volume. However, when a volume exceeding the segment held by the volume indicated by the LUN is accessed in the volume server 1200, a volume is added from the segment manager part 1233. This operation is identical to the operation of the aforementioned volume provider part 1230.

On the other hand, when the application 1110 has performed a volume capacity control of a volume expanded by itself and the capacity actually used by the application 1110 has reduced, a capacity difference before and after the deletion is reported to the commander part 1132 of the host 1100 by the application 1110 and the aforementioned volume reduction procedure (FIG. 16) is performed in the volume server via the commander part 1132 of the host 1100. By these processes, the number of segments in use by the volume server is matched with the operation of the application 1110 and an appropriate logical volume capacity can be provided.

(2) Second Embodiment

In the first embodiment, when a write I/O access occurs to other than a storage domain of a logical volume provided from the volume server 1300 to the host 1100, the volume server 1200 successively allocates a storage domain, thereby performing a storage domain expansion to the logical volume provided by the volume server 1200. In the second embodiment, according to an instruction of the application 1110, a storage capacity expansion of a logical volume is performed in advance via the commander part 1132 of the host 1100 and the storage capacity of the logical volume is recognized by the OS 1130 before becoming usable by the application 1110. This procedure will be explained by referring to FIG. 18.

Firstly, the commander part 1132 of the host 1100 receives a storage domain expansion request by mLBA from the application 1110 (step 18001). The commander part 1132 of the host 1100 issues a write I/O to the LBA as a total of the entire logical volume capacity and the expanded domain mLBA (step 18002). The I/O detector part 1231 of the volume server 1200 performs a capacity expansion processing to the capacity controller part 1232 because the volume provided by the volume server is expanded by mLBA (step 18003). If the write I/O is successful (step 18004) and the storage domain is increased, then step 18005 is performed, and if the write I/O fails, the process terminates without performing the storage domain expansion. In step 18005, the commander part 1132 of the host 1100 increases by mLBA the end block count of the logical area information of the OS 1130 corresponding to the logical volume provided by the volume server 1200. This completes the explanation of the storage domain expansion procedure of the logical volume provided from the volume server 1200 via the application 1110.

According to the present invention, by adding a storage domain to a volume server according to a request from the volume server, the application of the host computer can use a single volume which can be dynamically expanded.

What is claimed is:
1. A system comprising:
   a storage system which provides a logical volume; and
   a host which sends data to the logical volume of the storage system,
   wherein the storage system includes,
      a plurality of disk devices,
      a controller, coupled to the plurality of disk devices, which manages a plurality of storage areas provided by the plurality of disk devices,
   wherein the host includes,
      an application which sends data to the logical volume, and
      an operating system which manages a block position of the logical volume,
   wherein, if the operating system receives a request from the application to expand a first capacity of the logical volume, the operating system sends a write request to the logical volume,
   wherein, in response to the write request, the controller allocates at least one of the plurality of storage areas to the logical volume, and
   wherein the controller monitors a second capacity of storage areas allocated to the logical volume relative to a third capacity of the plurality of storage areas.
2. The system according to claim 1, wherein the at least one of the plurality of storage areas is allocated to a portion of the logical volume if the at least one of the plurality of storage areas is needed in order to write data of the write request and is not already allocated to the portion of the logical volume.

3. The system according to claim 1, wherein data of the write request is written to the at least one of the plurality of storage areas after the at least one of the plurality of storage areas is allocated.

4. The system according to claim 1, wherein, in response to another write request addressed to a portion of the logical volume to which the at least one of the plurality of storage areas is allocated, after receiving the write request, updating data on the at least one of the plurality of storage areas by data of the another write request.

5. The system according to claim 1, wherein:
the plurality of storage areas are a plurality of segments.

6. The system according to claim 1, wherein if a value obtained by the monitoring by the controller is equal to or greater than a threshold, at least one additional disk device is requested by the controller to be added to the plurality of storage areas so as to increase the capacity of the plurality of storage areas.

7. The system according to claim 1, wherein if a ratio calculated based on the monitoring by the controller is equal to or greater than 90%, at least one additional disk device is requested by the controller.

8. The storage system according to claim 1,
wherein the controller calculates a ratio based on a number of storage areas in use and a total number of the plurality of storage areas, and determines whether the ratio is equal to or more than a predetermined ratio, and
wherein if the ratio is equal to or more than the predetermined ratio, the controller makes a request to add a storage area.

9. The system according to claim 1,
wherein the controller comprises an Input/Output detector, an Input/Output processor, a capacity controller, a segment manager, and a physical and logical address manager,
wherein the Input/Output detector accepts an Input/Output request, including a write request and/or a read request, to the logical volume from the host;
wherein the Input/Output processor performs an Input/Output process according to the Input/Output request;
wherein the capacity controller allocates a storage area to the logical volume;
wherein the segment manager manages the storage areas; and
wherein the physical and logical address manager manages a relationship between a physical address and a logical address.

10. The system according to claim 1,
wherein, if the controller receives the write request from the host, the controller detects a logical block address in the logical volume and determines whether or not the logical block address information exists in the at least one of the plurality of storage areas.

11. The storage system according to claim 1, further comprising:
a segment management table which stores a disk device number for identifying each of the disk devices, a segment number assigned to each of the storage areas, a start logical block address which is a start address of the storage area, a size of the storage area, and a state indicating whether or not the storage area is in use, associated with each other; and
a physical and logical management table which stores a logical unit number for identifying the logical volume, the segment number, a start address of the logical volume, and an end address of the logical volume, associated with each other,
wherein the controller selects the segment number to be accessed and the start address of the corresponding logical volume from the physical and logical management table, and calculates the disk device number and the physical address of the disk device to be accessed by an I/O request using the selected segment number and the segment management table.

12. The storage system according to claim 11,
wherein the controller checks a rate of the storage areas with an in-use state on the segment management table, and indicates necessity of an addition of a new disk device if the rate reaches a predetermined value, and
wherein when the new disk device is added to the storage system, the controller checks a capacity of the added new disk device, and adds the capacity information to the segment management table information for the added new disk device.

13. The storage system according to claim 1, wherein the write request is issued for an expanded domain of the logical volume.

14. The storage system according to claim 13, wherein the controller determines whether or not to accept the write request for the expanded domain based on the second capacity and the third capacity.

15. The storage system according to claim 13, wherein if the third capacity includes a free area equal to or larger than a size of the expanded domain, the controller executes the write operation and reports the write completion to the host, and the host increases the first capacity by the size of the expanded domain.

16. The storage system according to claim 13, wherein if the controller determines that a difference between the second capacity and the third capacity is greater than a size of the expanded domain, the controller executes the write request.

17. The storage system according to claim 13, wherein if the third capacity does not include a free area equal to or larger than a size of the expanded domain, the controller reports a write failure to the host and retains the first capacity unchanged.

18. The storage system according to claim 1, wherein the third capacity is equal to or larger than the second capacity and the first capacity is equal to or larger than the second capacity.

19. The storage system according to claim 1, wherein the host further includes an interface and the operating system sends the write request to the storage system via the interface.

* * * * *